US007842106B2

(12) United States Patent
Gonchar et al.

(10) Patent No.: US 7,842,106 B2
(45) Date of Patent: *Nov. 30, 2010

(54) PROCESS FOR USING POLYMERIC WASTE MATERIALS TO PRODUCE FUEL

(75) Inventors: Howard Gonchar, Kingston, PA (US);
Roman Bielski, Coopersburg, PA (US);
Ken Battle, Shamong, NJ (US); Donald Keiper, Wilkes-Barre, PA (US)

(73) Assignee: Recarbon Corp., Kingston, PA (US)

( * ) Notice: Subject to any disclaimer, the term of this patent is extended or adjusted under 35 U.S.C. 154(b) by 132 days.

This patent is subject to a terminal disclaimer.

(21) Appl. No.: 11/830,681

(22) Filed: Jul. 30, 2007

(65) Prior Publication Data

US 2009/0031620 A1 Feb. 5, 2009

(51) Int. Cl.
*C10L 5/00* (2006.01)
(52) U.S. Cl. .................... 44/605; 44/628; 521/40; 521/41
(58) Field of Classification Search .................. 44/605, 44/628; 521/40, 41
See application file for complete search history.

(56) References Cited

U.S. PATENT DOCUMENTS

| | | | |
|---|---|---|---|
| 3,996,022 A * | 12/1976 | Larsen | 48/197 R |
| 5,304,576 A | 4/1994 | Martinez | |
| 5,389,691 A | 2/1995 | Cha et al. | |
| 5,618,852 A | 4/1997 | Adkins | |
| 5,821,396 A | 10/1998 | Bouziane | |
| 5,905,095 A * | 5/1999 | Adkins | 521/43.5 |
| 6,066,685 A * | 5/2000 | Nobusawa et al. | 523/332 |
| 6,736,940 B2 | 5/2004 | Masemore et al. | |
| 6,802,897 B1 | 10/2004 | Lackey et al. | |

FOREIGN PATENT DOCUMENTS

| | | |
|---|---|---|
| KR | 10-0148205 | 8/1998 |
| KR | 10-2005-0076204 | 6/2005 |
| KR | 10-2007-0010867 | 1/2007 |

OTHER PUBLICATIONS

Rios, M. Gontijo, V.P. Ferraz, R.M. Lago, and M. H. Araujo, J. Braz. Chem. Soc., 17, 2006 doi: 10.1590/S0103-50532006000300027.
Mastral et al., Assesment of the Tire Role in the Coal-Tire Hydrocoprocessing, Energy & Fuels 1997, 11, 676-680.
Sugano et al., Additive Effect of Waste Tire on the Hydrogenolysis Reaction of Coal Liquefaction Residue, Energy & Fuels 2006, 20, 2713-2716.
Cunliffe et al., Influence of Process Conditions on the Rate of Activation of Chars Derived from Pyrolysis of Used Tires, Energy & Fuels 1999, 13, 166-175.
Hope, Mark, Specification Guidelines for Tire Derived Fuel.
Osmont, et al., Thermochemistry of C-C and C-H Bond Breaking in Fatty Acid Methy Esters, American Chemical Society Web Publication, Jun. 15, 2007.
Giray et al., Supercritical extraction of scrap tire with different solvents and the effect of tire oil on the supercritical extraction of coal, Fuel Processing Technology 85 (2004) 251-265.
Piskorz et al., Recovery of Carbon Black from Scrap Rubber, Energy & Fuels, 1999, 13, 544-551.
Urban Bus Operation, Life Cycle Inventory of Biodiesel and Petroleum Diesel, 171 NREL/SR-580-24089.
Singh, et al., Base-Catalyzed Fast Transesterification of Soybean Oil Using Ultrasonication, Energy & Fuels 2007, 21, 1161-1164.
Barnard, et al., Continuous Flow Preparation of Biodiesel Using Microwave Heating, Energy & Fuels 2007, 1777-1781.
Hribernik, et al., Influence of Biodiesel Fuel on the Combustion and Emission Formation in a Direct Injdection (DI) Diesel Engine, Energy & Fuels 2007, 21, 1760-1767.
Park, et al., Depolymerization of Styrene-Butadiene Copolymer in Near-Critical and Supercritical Water, Ind. Eng. Chem Res. 2001, 40, 756-767.
Unapumnuk, et al., Carbon Distribution from the Pyrolysis of Tire-Derived Fuels, Ind. Eng. Chem. Res. 2006, 45, 8757-8764.
Murillo, et al., Production and Application of Activated Carbons Made from Waste Tire, Ind. Eng. Chem. Res. 2005, 44, 7228-7233.
Kovuttikulrangsie et al., The molecular weight (MW) and molecular weight distribution (MWD) of NR from different age and clone Hevea trees, J. Sci. Technol., 2005,27(2):337-342.

* cited by examiner

*Primary Examiner*—Cephia D Toomer
(74) *Attorney, Agent, or Firm*—Mitchell A. Smolow

(57) ABSTRACT

The present invention provides an economic process which utilizes biodiesel and other high boiling esters containing short alkyl groups to produce liquid fuels from polymeric materials such as, for example, used tires. In a first embodiment, polymeric material is dissolved/suspended/dispersed in biodiesel upon heating to form a product containing between about 10% and about 35% by weight of polymeric material. At least some of the biodiesel is recovered and reused to dissolve/suspend/disperse additional polymeric material to form additional product. After a predetermined number of cycles, the accumulated product is used as a fuel. In a second embodiment, polymeric material is dissolved/suspended/dispersed upon heating in biodiesel to form a mixture containing between about 30% and about 90% by weight of the polymeric material to be used as heavy fuel oil to be burned as is or bulk refined. The present invention also encompasses the fuel formed by the processes described.

57 Claims, No Drawings

PROCESS FOR USING POLYMERIC WASTE MATERIALS TO PRODUCE FUEL

FIELD OF THE INVENTION

This invention relates to a process for transforming various compounds and mixtures containing macromolecular compounds comprising hydrogen, carbon and other elements into fuels. More particularly, the invention relates to economic transformation of tire rubber and other polymers into liquid fuels.

BACKGROUND OF THE INVENTION

The accumulation of waste polymeric materials having extremely low or zero degradation rates has become a significant societal problem. For example, the number of tires produced and disposed of in the United States is estimated to be about 300 million annually. The uses for waste tires are rather limited. While they have been added to asphalt, burned in kilns, used as shock absorbers in playgrounds, and used as absorbers of oil spills, the vast majority of waste tires remain as a problematic environmental and health concern.

Natural rubber is a polymer deriving from isoprene (2-methyl-1,3-butadiene). The molecular weight of the natural rubber varies significantly and is between $10^4$ and $10^6$. The Merck Index defines rubber as cis-1,4-polyisoprene with a molecular weight varying from 100,000 to one million. Both natural and synthetic rubber is usually cross-linked with sulfur, peroxides or bisphenol. The process, called vulcanization, produces a three-dimensional lattice. It improves properties of the product which becomes much stronger, more temperature sensitive, more elastic and non-sticky.

While natural rubber is soluble in chloroform, absolute ether, many fixed and volatile oils, petroleum ether, carbon disulfide, and oil of turpentine, the cross-linked product is much less so. The synthetic varieties can derive from one or more of the following: 1,3-butadiene, chloroprene (2-chloro-1,3-butadiene), and similar monomers. The relevant copolymers often derive from styrene. Styrene-butadiene-rubber, or SBR, is the largest synthetic component of tires.

An estimated 60% of all manufactured rubber is used in tires. A typical passenger tire consists of natural rubber (14%), synthetic rubber (27%), carbon black (28%), steel (14-15%), and additives (fabric, fillers, accelerators, antiozonants, etc.) (16-17%). Its average waste weight is 20 lbs. A typical waste truck tire weights 100 lbs and contains reverse proportions of synthetic and natural rubber as compared with a car tire.

Waste tires are not biodegradable, thereby creating both an environmental and health problem. They exacerbate the spread of mosquito-borne diseases in that they provide an insect breeding ground. Additionally, whole tires are difficult to store in landfills in that they are bulky and cause damage to the landfill cap or seal, as they tend to "float" their way to the top of the fill. In an attempt to prevent this migration, many landfills require that scrap tires be shredded, a process which is energy intensive and wasteful if it does not produce any useful product. Due to the cost associated with proper disposal, many tires are dumped illegally.

In response to these problems, there are a number of known methodologies utilized to recycle used rubbers, all of which have significant limitations. Tires have been both combusted to produce energy and pyrolized to produce fuels. Pyrolysis is generally defined as thermal degradation at temperatures as high as 900 degree C. in an inert atmosphere and has been favored because lower temperature attempts to use tires as a source of energy have heretofore not been economic.

The breakage of rubber's covalent bonds requires that relatively large quantities of energy be delivered to the waste rubber material. Pyrolysis usually takes place at temperatures above 530 degrees C. All of these high-energy techniques use "dry" processing, in that the two reaction products are gas and solids. Some of the gas exhibits molecular weight high enough to condense with cooling water, useful as a valuable liquid fuel, but most is lower value gas and solid fuel.

Potentially economic and useful methodologies that have been attempted to introduce energy into rubber to break the covalent bonds are direct heating, ultra-sound, and microwave energy. One such approach using relatively low temperatures employs controlled oxidation, for example, the controlled oxidation of styrene-butadiene sulfur cross-linked rubber with nitric acid.

A single car waste tire weighing about 20 pounds has about the same heating value of coke, approximately 15,000 BTU's per pound, or approximately 258,000 BTU's per tire. Therefore, if economical, environmentally sound processes can be formulated to convert waste tires and other polymeric materials into a fuel source, much of the aforementioned problems can be obviated. Accordingly, there is still a continuing need for improved methods of transforming tires and other polymeric materials into fuel. The present invention fulfills this need and further provides related advantages.

BRIEF SUMMARY OF THE INVENTION

The present invention provides an economic process which utilizes solvents such as biodiesel and other esters containing short alkyl groups, fats and oils, and relatively high molecular weight alkenes to produce liquid fuels from polymeric materials such as, for example, used tires.

In a first embodiment, a process for using polymeric material to produce fuel comprises the steps of adding a predetermined quantity of polymeric material to a predetermined cycle starting solvent volume; introducing an energy source into the solvent for a predetermined time at a predetermined temperature and pressure to form a product; removing the energy source; recovering and removing at least some solvent from the product for use in a subsequent cycle; allowing the product to cool to a predetermined pumpable operative temperature; adding new solvent to the recovered, removed solvent to achieve a predetermined subsequent cycle solvent starting volume; repeating the process using the predetermined subsequent cycle starting volume; and repeating the above for a predetermined number of cycles.

In a second embodiment, a process for using polymeric material to produce fuel comprises the steps of adding a predetermined quantity of polymeric material to a predetermined quantity of solvent; introducing an energy source into the solvent for a predetermined time at a predetermined temperature and pressure to form a product; removing the energy source; and allowing the product to cool to a predetermined pumpable operative temperature.

In a third embodiment, a process for recovering steel from steel belted tires comprises the steps of adding a predetermined quantity of tire to a predetermined volume of solvent; adding an energy source into the solvent for a predetermined time at a predetermined temperature and pressure to allow the steel to separate from the tire; removing the energy source; and removing the separated steel from the solvent.

The present invention also encompasses the fuel formed by the processes described in detail below.

One advantage of the present invention is the economical utilization of waste macromolecular materials such as used tires and the economical removal of waste polymeric material from landfills.

A second advantage of the present invention is the reduction of the dependence on new fossil fuel sources.

Yet another advantage of the present invention is the reduction in the amount accumulated waste fats and oils such as those generated by food preparation due to their usage in the manufacture of solvent such as biodiesel.

A further advantage of the present invention is production of a relatively low cost fuel or crude oil.

Yet another advantage is that tire steel can be recycled economically, further enhancing the present invention's environmental benefits.

Still another advantage is that the process uses moderate temperatures and pressures, with concomitant energy savings and increased safety.

Other features and advantages of the present invention will be apparent from the following more detailed description of the preferred embodiments, taken in conjunction with the accompanying experiments which illustrate, by way of example, the principles of the invention.

DETAILED DESCRIPTION OF THE INVENTION

For purposes of this disclosure, the following definitions apply:

"polymeric material" are macromolecular compounds comprising substantially of carbon and hydrogen. It includes for example, vulcanized and non-vulcanized rubber, polystyrene, polyacrylates, polymethacrylates, and polymers produced as a result of condensation polymerization such as for example, polyesters. Other such materials include, for example, polyamides such as nylons, polyolefins, and natural rubber, polyisoprene.

"biodiesel" is a mixture of methyl, ethyl, or n-propyl esters of carboxylic acids or combinations thereof formed as a result of transesterification of fats with methanol, ethanol, or n-propanol, respectively.

"polymeric material degradation" is any process that decreases the molecular mass of the polymer including devulcanization. More specifically, degradation comprises of breaking covalent bonds such as for example, carbon-carbon, carbon-sulfur, carbon-oxygen, and sulfur-sulfur bonds.

"degradation products" are materials that are of lower molecular weight or physical size than the starting polymeric materials. The decrease of the molecular weight or physical size is the result of the breaking of one or more covalent bonds of the macromolecular material. "Degradation products" include, but are not limited to, products formed as a result of, for example, degradation of cross-links.

"solution", "suspension" and "dispersion" are used interchangeably.

"solvents" are:
  a. esters of carboxylic acid which exhibit sufficiently high boiling point to enable performing the reactions at temperatures necessary for the degradation and dissolution or dissolution of the polymeric material according to the present invention. While not required, the esters should preferably be liquids at ambient temperatures, for example, methyl, ethyl or n-propyl esters of long chain carboxylic acids, usually referred to as biodiesel; short alkyl chain (up to C-4) esters such as, for example, diethyl sebacate; and fats including waste fats, i.e. esters of glycerol and long chain carboxylic acid such as, for example, soy oil;
  b. 1-alkenes which exhibits sufficiently high boiling point to enable performing the reactions at temperatures necessary for the degradation and dissolution or dissolution of the polymeric material according to the present invention, for example, 1-octadecene; and
  c. mixtures of the above.

Although rubber waste tires are described as the exemplar, the invention is neither limited to waste tires nor rubber, but is contemplated to be used with the polymeric materials as defined above.

In a first step of a first embodiment of the present invention, polymeric material, for example, waste tire, is introduced into a solvent. Optionally, the material is introduced incrementally as it dissolves/suspends/disperses. The process may be conducted by, for example, batch mode or by continuous sequential operation. Preferably, an amount to form between about 10% and about 35% solution by weight, most preferably, between about 15% and 20% solution by weight of polymeric material is introduced.

In a second step, energy, for example, ultra-sound, microwave energy, and preferably direct heat, is introduced into the solvent containing immersed polymeric material for a predetermined time sufficient to dissolve/suspend/disperse the degradation products to form a solution, suspension, dispersion or combinations thereof. It is not a requirement that all polymeric material be dissolved. In the preferred embodiments, process temperature is between about 180 degrees C. and about 400 degrees C.; preferably between about 310 degrees C. and about 325 degrees C.; and most preferably between about 320 degrees C. and about 325 degrees C. In the preferred embodiments, the process is carried out at atmospheric pressure, which provides both economic and safety advantages. However, the process is not limited to atmospheric pressure.

Optionally, the polymeric material may be machined or otherwise formed into small pieces prior to immersion in the liquid. Small polymeric material size is not a requirement, as the surface area of polymeric material in contact with the liquid does not determine the time of the process, but rather, we believe process time is determined by the ability of solvent to penetrate the polymeric material. Solvent penetration occurs more freely upon energy introduction and optional agitation.

Low boiling distillates, for example, distillates having a boiling point up to about 100 degrees C., may be distilled off. Due to relatively low process temperatures, the process of the present invention does not produce significant quantities of gas. Those gases that are formed are flammable and constitute an additional small energy by-product of the process. The distillates consist of two phases—one aqueous, the other organic.

In a third step, the energy source is removed and tire steel remnants are removed from the solution/suspension/dispersion, hereinafter referred to as the "product". Known technology to recover scrap steel from waste tires produces steel coated with rubber and other contaminants. The present invention produces steel better suited for recycling in that the steel separates from the rubber early in the process. The steel can thereafter be recovered using the physical removal, for example, through the use of magnets, tongs, forceps, strainer and the like.

Other non-polymeric material for example, carbon black, and small quantities of zinc oxide, silica, and calcium carbonate used as fillers are optionally removed. Depending on final product usage, none, some, or all of the remaining non-steel, non-polymeric material is removed. The removal process may be by, for example, filtering, siphoning, and centrifugation. Once removed, the non-polymeric material may be recycled through known recycling methods.

In a fourth step, the solvent is recovered from the product, for example, by distillation, and reused to dissolve/suspend/disperse additional polymeric material for a predetermined number of cycles. Optionally, a predetermined amount of new solvent may be added to the used solvent recovered from the prior cycle to achieve a predetermined cycle starting volume.

In a fifth step, the product is cooled to an effective safe temperature for transportation for use as, for example, fuel. Total homogenization is not required, but the product should be pumpable at predetermined operative temperatures.

In a first step of a second preferred embodiment of the present invention, polymeric material, for example, waste tire, is introduced into a liquid. Preferably, amount to form between about 30% and about 90% solution by weight, most preferably, about 60% solution by weight of polymeric material is introduced. In all other aspects, steps one through three are as described above.

In a fourth step, the product is cooled to an effective safe temperature for transportation for use as, for example, fuel. Total homogenization is not required, but the product should be pumpable at predetermined operative temperatures.

In a fifth, optional step, the product is further refined using known methods to produce multiple categories of known fuel.

The following experiments were conducted utilizing differing preselected solvents: A sample of such a mass as to produce a solution of about 10-50% w/w of tire was cut to pieces not larger than about 1 inch and introduced into a three neck reactor (for 250, 500 or 1000 ml) filled with a predetermined quantity of solvent and an optional selected additive of about 0-0.5%. The first neck was used to constantly mix the reactor content using a mechanical stirrer, the second neck enabled constant measurements of the temperature of the reactor content with a thermocouple, and the third neck was connected to a Liebig's condenser to constantly distill off low boiling products, if formed. The mixture was heated to a predetermined temperature for a predetermined period of time.

As the reaction progressed, the pieces of tire disappeared and the mixture became black. The reactor was allowed to cool and when the mixture's temperature fell to below about 140 degrees C. its content was poured through a mesh strainer. In all cases steel remnants were easily removed and simply cleaned with no rubber residue remaining on the steel. This occurred even in low temperature experiments down to about 180 degrees C.

Selected samples of the distillate as well as the filtrate were analyzed using GC/MS. The filtrate was obtained by either passing the product through a paper filter under both normal and decreased pressure or by centrifugation to separate the carbon black and other inorganic material from the solution/suspension/dispersion.

The following is a summary of experimental findings. While the exemplars were conducted at atmospheric pressure, the present invention is not limited to atmospheric pressure.

The following liquids were utilized as solvents: waste cooking oil, vegetable (soy) oil, diesel oil, paraffin, 1-octadecene, biodiesel, dibenzyl sebacate, dibutyl phthalate, tetraethylene glycol, and diethyl sebacate.

Soybean oil produced highly encouraging results, particularly when known devulcanizer additives such as ditolyl disulfide or zinc oxide and stearic acid were added. A substantially total solubilization of the mix required about 3 hours of heating at about 316 degrees C. to about 343 degrees C., with the latter being preferable.

Diesel oil having a boiling point of about 150 degrees C. to about 370 degrees C., with 90% above 204 degrees C. proved to be unacceptable. Paraffin also proved to be unacceptable because its waxy or solid character at ambient temperature made processing very difficult. Dibutyl phthalate processed at about 2 hours at about 290 degrees C. produced practically no degradation of rubber.

Dibenzyl sebacate and tetramethylene glycol (together with p-tolyl disulfide (PTDS)) heated with tire rubber to about 260 degrees C. also produced practically no dissolution of rubber in the medium.

1-octadecene produced results better than those achieved with vegetable oil, producing total solubilization of the tire in about 60 minutes at about 300 degrees C. using PTDS as an additive. Equal results were accomplished when employing a mixture of vegetable (soy) oil and 1-octadecene.

However, vegetable oil batches often overheated and scorched the rubber and the equipment. Consequently, a solvent with a lower boiling point was sought so that the temperature could be controlled by refluxing the mixture at the solvent's atmospheric boiling point. Biodiesel was chosen due to its reasonable price, relatively low boiling point, and acceptable viscosity even at ambient temperatures. The results were unexpected. Homogenization of the mix was achieved significantly faster than when other media were used. Due to the significant rate of biodiesel decomposition in the presence of tire rubber at reflux, the process was performed below the boiling point of biodiesel.

The effective temperatures were found to be between about 260 and about 345 degrees C. At higher temperatures the process required even less time but the rate of biodiesel degradation became a significant factor. The optimal temperature of the process is about 325 degrees C. at which disintegration of the tire rubber required about 30 minutes.

At temperatures higher than 325 degrees C. the biodiesel degradation in the presence of rubber became significant. It was even more the case when the biodiesel was refluxed above about 347 degrees C. Additives, including those helpful as devulcanizing agents, did not significantly improve the process's temperature or time. The process was conducted at tire concentrations varying from about 10% to more than about 50%. At concentrations higher than about 50% the product after standard process time still contained small rubber chunks which were soft and close to total disintegration.

The result was duplicated with diethyl sebacate heated to its boiling point of 312 degrees C. for about 30 minutes proving the process can be performed with other esters containing short alkyl chains.

Mixtures exposed to temperatures below about 290 degrees C. were difficult to filter or separate using a centrifuge. Liquefied products exposed to higher temperatures could be easily filtered to produce a black solid consisting primarily of carbon black. Thus, one advantage of bio-diesel is that the resulting mixture can be filtered and centrifuged to separate the solids from the liquid.

The filtered liquid without the solid material was analyzed using the GC/MS. Besides the products that were not sufficiently volatile to pass through the specific GC column kept at 300 degrees C., it contained three major peaks (MW=270, MW=296, and MW=298). They correspond to methyl palmitate ($C_{15}H_{31}COOCH_3$), methyl oleate ($CH_3(CH_2)_7CH=CH(CH_2)_7COOCH_3$), and methyl stearate ($C_{17}H_{35}COOCH_3$), respectively, which are typical components of biodiesel deriving from the soy oil.

When performing the process with biodiesel, low boiling products up to about 100 degrees C. were distilled off and collected. Usually, a few grams of a distillate were collected which consisted of two phases. The oil-phase distillate contained several peaks in the MS. They included molecular masses of 126 and 136. The exact structure of the corresponding compounds could not be determined. It is believed that initially the methyl or methoxyl group of the biodiesel reacts with the vulcanized rubber. For example, the methyl group reacts with the sulfur atoms to form a thiomethyl functionality. In all reactions above about 290 degrees C., there was some evolution of gas, with higher temperature and higher concentration of tire rubber producing more gas. The mass of the released gas was not significant and on every occasion it was tested it proved to be flammable.

The product of the treatment of tire rubber with biodiesel was analyzed for its BTU/lb value. The results for the mixture consisting of about 48% tire rubber (without steel) and about 52% biodiesel are listed in Table 1.

Although the mechanism of action of the methyl esters is not known for certain, we believe that initially there is a reaction involving rubber and the methyl ester (ethyl ester in the case of diethyl sebacate). The result of this reaction is some low boiling products (vide MS) containing O—$CH_3$ or S—$CH_3$. Simultaneously, the degradation of rubber is believed to be initiated.

The original size of carbon black particles used in tire manufacture is below 50 nm. Since the filtration is successful even at high concentrations of rubber (up to at least 30% w/w) we believe that during the rubber degradation the carbon black particles must form agglomerates. Alternatively, they may have formed upon rubber production. Otherwise, as stated above, they could not be separated using simple filtration or centrifugation since the initial size of carbon black particles in tires is much below 50 nanometers.

In most experiments a mixture of old and new tires from various sources deriving from cars and trucks were used.

The organic components of rubber include the benzene ring and a variety of aliphatic chains that may or may not comprise of double bonds. Thus, the mechanisms of potentially bond breaking/forming processes are: electrophilic aromatic substitution, electrophilic addition to double bonds and a plurality of free radical processes. Additionally, the presence of sulfur atoms in the system offers a nucleophilic center for a nucleophilic attack.

In line with these possibilities, additives tried include the following reactants: tert-nonyl polysulfide, 2-mercaptobenzothiazol, dibenzyl disulfide, bis(4-methoxyphenyl) disulfide, p-tolyl disulfide (PTDS); elemental sulfur; zinc dust; iron powder; Fenton reagent (formed in situ, for example, from iron (II) acetylacetonate and oxidizing agents); 2,3-dimethyl-2,3-diphenylbutadiene (thermally stable free radical initiator), and stearic acid and zinc oxide in various proportions; zinc bromide and 2,5-dimethoxybenzyl bromide, zinc bromide and trityl chloride, zinc bromide (purchased and formed in situ) and 2-phenylbenzyl bromide, zinc chloride and trityl chloride, and tin (IV) diacetoacetonate dichloride and dimethoxybenzyl bromide. Some of these additives, particularly those capable of electrophilic addition to double bonds, enabled shortening of the procedure. However, none of the tried additives decreased significantly the time required for the tires' degradation. The free radical initiators were not effective because, we believe, the carbon black acted as a scavenger of free radicals.

In one comparative experiment, car tire pieces (15.0 g) of the same origin were cut to small chunks (about 10 mm in diameter, about 65 pieces) and to substantially larger chunks (about 2.5 cm in diameter, 7 pieces), and separately immersed in 105.0 g of 100% biodiesel in a three neck 500 ml reactor and mechanically mixed and heated to about 300 degrees C. for about 30 minutes. The temperature in both experiments was strictly kept the same. After the mixtures had been cooled to about 150 degrees C. they were poured through a strainer. The degree of tire degradation was compared in both experiments. It was found that the degree of tire degradation did not differ. This indicates that the reaction time practically does not depend on the size of the rubber particles. It further indicates that the reaction is not limited only to the surface of the rubber material.

Polymerization of 1,3-butadiene or isoprene (methylbutadiene) produces a polymer with double bonds present between (previous) carbon atoms number 2 and 3. Natural or synthetic rubber is such a polymer which is known to be soluble is some organic solvents, including biodiesel. In comparison, vulcanization produces connections between the former double bonds of various rubber chains, formed by one or more sulfur atoms. Vulcanization (and any other cross-linking process) forms a three dimensional network. The molecular weight is close to infinity, and therefore, the cross-linked material is insoluble in solvents. It is believed that the novel process of the present invention achieves at least devulcanization, thereby forming a product that is thereafter soluble. Many non-vulcanized polymers when heated become amorphous and soluble in the solvent. In small concentrations when the solvent is cooled, they remain dispersed or dissolved in the mixture and become part of the pumpable fuel.

In the preferred embodiments, biodiesel is used as the solvent. Interestingly, no degradation of biodiesel at its boiling point without tire rubber has been observed.

Although the present invention has been described in connection with specific examples and embodiments, those skilled in the art will recognize that the present invention is capable of other variations and modifications within its scope. These examples and embodiments are intended as typical of, rather than in any way limiting on, the scope of the present invention as presented in the appended claims.

TABLE 1

| ASTM Method | Test | Result | Units |
|---|---|---|---|
| D4052 | Density @ 60 | 1.0304 | g/ml |
| D240 | Gross Heat of Combustion | 17048 | BTU/lb |
| D240 | Gross Heat of Combustion | 146442 | BTU/gal |
| D4294 | Sulfur | 0.414 | Wt % |
| D93 method B | Flash Point (PMCC) | 179.7 | deg F. |
| D445 at 100 deg C. | Kinematic Viscosity @ 100 | 787.4 | cSt |
| D482 | Ash @ 775 deg C. | 2.040 | Wt % |
| D95 | Water by Distillation | <0.05 | Vol % |
| D95 + D473 | Total Water & Sediment | 4.40 | Vol % |
| D473 | Sediment by Extraction | 4.40 | Vol % |

What is claimed is:

1. A fuel source producing process comprising the steps of:
   a. adding a polymeric material comprising waste tire to a solvent;
   b. introducing an energy source into the solvent;
   c. removing the energy source; and
   d. allowing the solvent and a degraded polymeric material to cool, thereby producing a fuel source, the fuel source comprising solvent and the degraded polymeric material;
   wherein the solvent comprises a solvent selected from the group consisting of a short alkyl chain ester; a 1-alkene and mixtures thereof.

2. The process of claim 1 wherein the polymeric material is added incrementally.

3. The process of claim 1 wherein the process is by batch mode.

4. The process of claim 1 wherein the process is by continuous sequential operation.

5. The process of claim 1 wherein the quantity of polymeric material introduced forms about 30% to about 90% solution by weight.

6. The process of claim 1 wherein the quantity of polymeric material introduced forms about 60% solution by weight.

7. The process of claim 1 wherein the energy source comprises direct heat.

8. The process of claim 1 wherein the energy source creates a process temperature between about 180 degrees C. and about 400 degrees C.

9. A fuel source producing process comprising the steps of:
a. adding a polymeric material comprising waste tire to a solvent;
b. introducing an energy source into the solvent;
c. removing the energy source; and
d. allowing the solvent and a degraded polymeric material to cool, thereby producing a fuel source, the fuel source comprising solvent and the degraded polymeric material;
wherein the energy source creates a process temperature between about 280 degrees C. and about 330 degrees C.

10. The process of claim 9 wherein the energy source creates a process temperature between about 320 degrees C. and about 325 degrees C.

11. The process of claim 1 wherein the process is conducted at atmospheric pressure.

12. The process of claim 1 wherein the solvent comprises biodiesel.

13. The process of claim 1 further comprising the step of machining the polymeric material prior to its addition to the solvent.

14. The process of claim 1 further comprising the step of agitating the solvent.

15. A fuel source producing process comprising the steps of:
a. adding a polymeric material comprising waste tire to a solvent;
b. introducing an energy source into the solvent;
c. removing the energy source;
d. allowing the solvent and a degraded polymeric material to cool, thereby producing a fuel source, the fuel source comprising solvent and the degraded polymeric material; and
e. distilling off distillates having a boiling point up to about 100 degrees C.

16. The process of claim 1 further comprising the step of removing at least some non-polymeric material from the solvent and degraded polymeric material.

17. The process of claim 16 wherein the at least some non-polymeric material is steel.

18. The process of claim 1 further comprising the step of refining the fuel source using known refining methods.

19. The process of claim 17 wherein the solvent comprises biodiesel.

20. The process of claim 17 wherein the steel is separated from the solvent by a removal method selected from the group consisting of filtering, siphoning, centrifugation, magnetic force, physical removal, and combinations thereof.

21. A fuel source producing process comprising the steps of:
a. adding polymeric material comprising waste tire to a first batch of solvent;
b. introducing an energy source into the solvent;
c. removing the energy source;
d. allowing the solvent and a degraded polymeric material to cool, thereby producing a fuel source, the fuel source comprising solvent and the degraded polymeric material;
e. recovering and removing some, but not all, solvent from the solvent and degraded polymeric material;
f. removing the fuel source;
g. adding a second batch of solvent to the recovered, removed solvent to achieve a second batch of solvent;
h. using the second batch of solvent to repeat steps a through h for at least one cycle.

22. The process of claim 21 wherein the some solvent is recovered from the product through distillation.

23. The process of claim 1 wherein the quantity of polymeric material introduced forms about 10% to about 35% solution by weight.

24. The process of claim 1 wherein the quantity of polymeric material introduced forms about 15% to about 20% solution by weight.

25. The process of claim 9 wherein the quantity of polymeric material introduced forms about 30% to about 90% solution by weight.

26. The process of claim 9 wherein the quantity of polymeric material introduced forms about 60% solution by weight.

27. The process of claim 9 wherein the quantity of polymeric material introduced forms about 10% to about 35% solution by weight.

28. The process of claim 9 wherein the quantity of polymeric material introduced forms about 15% to about 20% solution by weight.

29. The process of claim 9 wherein the energy source creates a process temperature between about 180 degrees C. and about 400 degrees C.

30. The process of claim 9 wherein the solvent comprises biodiesel.

31. The process of claim 9 further comprising the step of removing at least some non-polymeric material from the solvent and degraded polymeric material.

32. The process of claim 31 wherein the at least some non-polymeric material is steel.

33. The process of claim 15 wherein the quantity of polymeric material introduced forms about 30% to about 90% solution by weight.

34. The process of claim 15 wherein the quantity of polymeric material introduced forms about 60% solution by weight.

35. The process of claim 15 wherein the quantity of polymeric material introduced forms about 10% to about 35% solution by weight.

36. The process of claim 15 wherein the quantity of polymeric material introduced forms about 15% to about 20% solution by weight.

37. The process of claim 15 wherein the energy source creates a process temperature between about 180 degrees C. and about 400 degrees C.

38. The process of claim 15 wherein the solvent comprises biodiesel.

39. The process of claim 15 further comprising the step of removing at least some non-polymeric material from the solvent and degraded polymeric material.

40. The process of claim 39 wherein the at least some non-polymeric material is steel.

41. The process of claim 21 wherein the quantity of polymeric material introduced forms about 30% to about 90% solution by weight.

42. The process of claim 21 wherein the quantity of polymeric material introduced forms about 60% solution by weight.

43. The process of claim 21 wherein the quantity of polymeric material introduced forms about 10% to about 35% solution by weight.

44. The process of claim 21 wherein the quantity of polymeric material introduced forms about 15% to about 20% solution by weight.

45. The process of claim 21 wherein the energy source creates a process temperature between about 180 degrees C. and about 400 degrees C.

46. The process of claim 21 wherein the solvent comprises biodiesel.

47. The process of claim 21 further comprising the step of removing at least some non-polymeric material from the solvent and degraded polymeric material.

48. The process of claim 47 wherein the at least some non-polymeric material is steel.

49. The process of claim 9 further comprising the step of refining the fuel source.

50. The process of claim 15 further comprising the step of refining the fuel source.

51. The process of claim 21 further comprising the step of refining the fuel source.

52. A fuel source producing process comprising the steps of:
   a. adding a polymeric material to a solvent;
   b. introducing an energy source into the solvent;
   c. removing the energy source;
   d. allowing the solvent and a degraded polymeric material to cool, thereby producing a fuel source, the fuel source comprising solvent and the degraded polymeric material; and
   e. removing at least some non-polymeric material from the solvent and degraded polymeric material;
   wherein the solvent comprises a solvent selected from the group consisting of a short alkyl chain ester; a 1-alkene and mixtures thereof and the least some non-polymeric material is steel.

53. The process of claim 52 wherein the quantity of polymeric material introduced forms about 30% to about 90% solution by weight.

54. The process of claim 52 wherein the quantity of polymeric material introduced forms about 10% to about 35% solution by weight.

55. A fuel source producing process comprising the steps of:
   a. adding a polymeric material to a solvent;
   b. introducing an energy source into the solvent;
   c. removing the energy source;
   d. allowing the solvent and a degraded polymeric material to cool, thereby producing a fuel source, the fuel source comprising solvent and the degraded polymeric material; and
   e. removing at least some non-polymeric material from the solvent and degraded polymeric material;
   wherein the energy source creates a process temperature between about 280 degrees C. and about 330 degrees C. and the at least some non-polymeric material is steel.

56. A fuel source producing process comprising the steps of:
   a. adding a polymeric material to a solvent;
   b. introducing an energy source into the solvent;
   c. removing the energy source;
   d. allowing the solvent and a degraded polymeric material to cool, thereby producing a fuel source, the fuel source comprising solvent and the degraded polymeric material;
   e. distilling off distillates having a boiling point up to about 100 degrees C.; and
   f. removing at least some non-polymeric material from the solvent and degraded polymeric material, wherein the at least some non-polymeric material is steel.

57. A fuel source producing process comprising the steps of:
   a. adding polymeric material to a first batch of solvent;
   b. introducing an energy source into the solvent;
   c. removing the energy source;
   d. allowing the solvent and a degraded polymeric material to cool, thereby producing a fuel source, the fuel source comprising solvent and the degraded polymeric material;
   e. recovering and removing some, but not all, solvent from the solvent and degraded polymeric material;
   f. removing at least some non-polymeric material from the solvent and degraded polymeric material, wherein the at least some polymeric material is steel;
   f. removing the fuel source;
   g. adding a second batch of solvent to the recovered, removed solvent to achieve a second batch of solvent;
   h. using the second batch of solvent to repeat steps a through h for at least one cycle.

* * * * *